(12) United States Patent
Kadowaki

(10) Patent No.: US 6,913,357 B2
(45) Date of Patent: Jul. 5, 2005

(54) PLASTIC PHOTOCHROMIC LENSES FOR GLASSES AND PROCESS FOR THEIR PRODUCTION

(75) Inventor: Shinichiro Kadowaki, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/466,372

(22) PCT Filed: May 13, 2002

(86) PCT No.: PCT/JP02/04608

§ 371 (c)(1),
(2), (4) Date: Jan. 8, 2004

(87) PCT Pub. No.: WO02/093236

PCT Pub. Date: Nov. 21, 2002

(65) Prior Publication Data

US 2004/0109133 A1 Jun. 10, 2004

(30) Foreign Application Priority Data

May 14, 2001 (JP) ...................................... 2001-143150

(51) Int. Cl.⁷ ............................................... G02C 7/02
(52) U.S. Cl. ...................................... 351/177; 351/163
(58) Field of Search .................... 351/44, 159, 162–67, 351/177–78; 452/164, 167; 359/241, 580–8; 65/30.11; 430/332; 252/582, 588; 204/157.15; 106/47; 427/162, 164–9

(56) References Cited

U.S. PATENT DOCUMENTS 5,621,017 A * 4/1997 Kobayakawa et al. ........ 522/16
5,914,174 A   6/1999 Gupta et al. ................. 428/174
6,166,855 A * 12/2000 Ikeyama et al. ............. 359/580
6,602,603 B2 * 8/2003 Welch et al. ................ 428/412
6,646,104 B1 * 11/2003 Mori et al. .................. 528/377

FOREIGN PATENT DOCUMENTS

| JP | 5-34649    | 2/1993  |
| JP | 10-338869  | 12/1998 |
| JP | 11-170387  | 6/1999  |

OTHER PUBLICATIONS

Shinichiro Kadowaki, Machine Translation of Japanese document 5-34649, Japanese Patent 3073556 published Feb. 6, 2000.*

* cited by examiner

Primary Examiner—Jordan M. Schwartz
Assistant Examiner—Jessica Stultz
(74) Attorney, Agent, or Firm—Oblon, Spivak, McClelland, Maier & Neustadt, P.C.

(57) ABSTRACT

A method of manufacturing plastic photochromic lenses includes obtaining a lens by polymerizing and curing a monomer mixture. The monomer mixture includes one of monofunctional and bifunctional methacrylic ester monomers, a trifunctional methacrylic ester monomer and a photochromic dye. Then, radiation including ultraviolet radiation is directed onto a surface of the lens obtained so that the radiation activates the surface of the lens to break down macromolecular chains of the surface of the lens. A composition including an organic silicon compound and a colloidal metal oxide is coated onto the surface of the lens exposed to the radiation. The composition coated is cured to obtain a hard surface film.

10 Claims, No Drawings

PLASTIC PHOTOCHROMIC LENSES FOR GLASSES AND PROCESS FOR THEIR PRODUCTION

TECHNICAL FIELD

The present invention relates to a plastic photochromic lens for eyeglasses having a hard surface film with good resistance to abrasion that rapidly develops color and rapidly fades, and a method of manufacturing the same.

TECHNICAL BACKGROUND

A wide variety of organic photochromic dyes have been developed in recent years, and dyes available as commercial products are increasing constantly. These have been extensively applied to eyeglass lenses in the general market trend toward plastic. Currently, plastic photochromic lenses in which organic photochromic dyes have been applied are currently being marketed for use in eyeglasses.

These plastic photochromic lenses develop color in the bright outdoors to produce the same antiglare effect as high-density color lenses, but return to high transmittance when moved indoors. However, a more rapid response is demanded. Currently, several tens of minutes are required to return to pre-coloration transmittance from a state in which color has been fully developed. When compared to the coloration process, which reaches a state of high coloration in about one minute, the fading rate is extremely slow and requires improvement.

The coloration reaction is highly dependent on the inherent characteristics of photochromic dyes resulting from their molecular structures, and is known to be greatly, affected by the polymer matrix in which the dyes are present. Plastic photochromic lenses are generally manufactured by dissolving a photochromic dye in a mixture of monomers followed by mold casting polymerization. Methacrylic monomers are desirably employed as the monomers. Further, photochromic properties vary greatly based on the composition of the mixture of methacrylic monomers. Accordingly, it has been found that a rapid photochromic reaction is attained by the simultaneous use of monofunctional or bifunctional monomers and short-chain trifunctional or greater monomers to the extent that the basic properties such as transmittance, photoresistance, strength, thermal resistance, and cutting and grinding processability required of eyeglass lenses are achieved.

Further, resistance to abrasion is imparted to the plastic lenses generally employed in eyeglasses by means of a multifunctional acrylate or methacrylate ultraviolet-curing film or silicone or melamine thermosetting film applied to the plastic substrate surface. Of these, organopolysiloxane hard films obtained by thermosetting are the most widespread. Since these hard films exhibit high adaptability with the diethylene glycol bisallyl carbonate resin and polythiourethane resins that are currently employed as the mainstream eyeglass substrate resins and can be made to adhere well to the substrate resin by a simple pretreatment in the form of immersion in an alkali aqueous solution, they are currently widely employed in the trade. Metal colloids are often incorporated into the film component of organopolysiloxane cured films to significantly improve the basic performance of the hard surface film, such as resistance to abrasion and photoresistance.

However, substrates of methacrylic resin generally tend not to adhere well to the above-mentioned organopolysiloxane hard films, and the introduction of metal colloids further disrupts adhesion. Further, the introduction of trifunctional and above monomers that effectively improve the coloration reaction of photochromic lenses as substrate resin components is known to sharply decrease adhesion. Thus, in combinations of methacrylic substrate resins employing polymerization components in the form of trifunctional or above monomers and hard surface films comprising metal colloids, simply immersing in the above-mentioned alkali aqueous solutions does not yield the practical adhesion required of eyeglass lenses.

Accordingly, a number of means other than pretreatment with chemicals such as alkali aqueous solutions are conceivable for improving adhesion when a polyorganopolysiloxane hard surface film comprising a metal colloid is provided on a methacrylic substrate resin employing a trifunctional or greater monomer as a polymer component. For example, general methods include physically edging the surface by rubbing cloth, paper, or a sponge containing an abrasive against the substrate resin, providing an adhesive layer of polyurethane or the like between the substrate resin and hard film, and treating the substrate resin with plasma.

However, eyeglass lenses come in an extremely large variety of magnifications and designs. The method of physically edging the surface by rubbing the substrate resin with cloth, paper, or sponge containing an abrasive is difficult to apply uniformly, reliably, and in large quantity, creating problems in manufacturing efficiency.

Further, in the method of providing an adhesive layer between the plastic lens substrate and the hard film, both the adhesive layer and the hard film must be coated, dried, and thermoset in cumbersome steps. During these operations, the potential for contamination with foreign matter increases. When a hard film is provided on a soft adhesive layer, surface hardness tends to decrease relative to when no intermediate adhesive layer is provided.

In the method of plasma treating the substrate resin, the result tends to be influence by the composition of the substrate resin. In substrate resins comprising trifunctional or greater monomers, there is a problem that accomplished improvement in adhesion is inadequate.

Accordingly, the present invention, devised to solve the above-stated problems of conventional art, has for its object to provide both a means of imparting adequate adhesion even to hard surface films comprising highly concentrated metal colloids in methacrylic resin lenses comprising trifunctional or greater monomers, thereby providing plastic photochromic lenses having hard surface films with rapid color fading reaction speed, good resistance to abrasion, and good adhesion, and a method of manufacturing the same.

DISCLOSURE OF THE INVENTION

The above-described problems are solved by the method of manufacturing lenses and lens described below.

That is, the present invention is a method of manufacturing plastic photochromic lenses characterized by comprising the steps of: obtaining a lens by polymerizing and curing a monomer mixture comprising at least (1), (2), and (3) below; directing radiation comprising ultraviolet radiation of a wavelength of less than or equal to 300 nm onto at least a portion of the surface of the lens obtained; coating a composition comprising (4) and (5) below onto the surface of the lens that has been exposed to said radiation; and curing said coating to obtain a hard surface film:

(1) a monofunctional or bifunctional methacrylic ester monomer comprising 50 weight percent or more of the monomer mixture;

(2) a trifunctional or greater methacrylic ester monomer comprising 1 to 30 weight percent or more of the monomer mixture;

(3) one or more photochromic dyes;

(4) an organic silicon compound comprising an alkoxy group and an epoxy group; and (5) a colloidal metal oxide.

Further, the present invention relates to plastic photochromic lenses obtained by the above-described manufacturing method of the present invention, and in particular, to plastic photochromic lenses for use in eyeglasses.

BEST MODE OF IMPLEMENTING THE INVENTION

The manufacturing of the photochromic lens of the present invention comprises a step of incorporating photochromic dye (3) into a mixture of monomers (1) and (2) and then polymerizing and curing the mixture to obtain a lens comprised of a resin composition. Monomers yielding high transmittance, adequate heat resistance, rigidity, and cutting and grinding processability in eyeglass lenses and that can most effectively facilitate appearance of the characteristics of photochromic dyes are desirably employed. Monofunctional and bifunctional methacrylic ester monomers are primarily employed as such monomers.

Examples of monofunctional methacrylic ester monomers are: methyl methacrylate, ethyl methacrylate, n-butyl methacrylate, ethylhexyl methacrylate, glycidyl methacrylate, benzyl methacrylate, phenyl methacrylate, cyclohexyl methacrylate, isobornyl methacrylate, and adamantyl methacrylate. Examples of bifunctional methacrylic ester monomers are: ethylene glycol dimethacrylate, diethylene glycol dimethacrylate, triethylene glycol dimethacrylate, tetraethylene glycol dimethacrylate, tripropylene glycol dimethacrylate, 1,4-butanediol dimethacrylate, 1,6-hexanediol dimethacrylate, glycerin dimethacrylate, 2,2-bis[4-(methacryloxyethoxy)phenyl]propane, and 2,2-bis[4-(methacryloxyethoxy)phenyl]propane.

These monomers (1) are components that maintain high transmittance and adequate heat resistance, rigidity, and cutting and grinding processability as eyeglass lenses; effectively facilitate appearance of the characteristics of photochromic dyes; and constitute 50 weight percent or more of the monomer mixture. The blending ratio of monomer (1) to monomer (2), essential elements of the present invention, is desirably such that monomer (1) constitutes 99 weight percent or less of the monomer mixture. Further, two or more such monomers may be used in combination.

Adding a suitable quantity of trifunctional or greater methacrylic ester monomer to the above-described monomer main component improves color fading in the photochromic lens made therefrom.

Examples of such monomers are trimethylolpropane trimethacrylate, trimethylolethane trimethacrylate, and pentaerythritol trimethacrylate.

The quantity of trifunctional or greater methacrylic acid ester monomer that is added falls within a range of from 1 to 30 weight percent, preferably 3 to 25 weight percent. When the quantity of trifunctional or greater methacrylic acid ester monomer that is added is less than 1 percent or exceeds 30 percent, no improvement is achieved in photochromic reaction speed.

Monomers capable of copolymerization with this monomer mixture may be added to the extent that overall physical properties are not compromised. Examples of such copolymerizable monomers are: methyl acrylate, ethyl acrylate, n-butyl acrylate, ethylhexyl acrylate, cyclohexyl acrylate, benzyl acrylate, phenyl acrylate, isobornyl acrylate, ethylene glycol diacrylate, triethylene glycol diacrylate, 1,6-hexanediol diacrylate, trimethylolpropane triacrylate, pentaerythritol triacrylate, 2,2-bis[4-(acryloxy)phenyl]propane, 2,2-bis[4-(acryloxyethoxy)phenyl]propane, and other acrylic ester monomers; styrene, methylstyrene, dimethylstyrene, chlorostyrene, dichlorostyrene, bromostyrene, p-chloromethylstyrene, divinylbenzene, and other nucleus-substituted styrenes; α-methylstyrene, acrylonitrile, methacrylonitrile, maleic anhydride, and N-substituted maleimide; diethyleneglycol bisallyl carbonate, diallyl phthalate, and other allylated compounds.

These copolymerizable monomers are desirably employed in a proportion falling within a range of 0 to 30 weight percent of the monomer mixture.

These may be suitably mixed to obtain a good monomer composition for use in the present invention. Photochromic dye (3) is dissolved into the monomer mixture.

The molecular structure of the photochromic dyes is not specifically limited. For example, it may be a spirooxazine, spiropyran, chromene, fulgide, or fulgimide compound, most of which are readily available commercially. It is also possible to employ commercial dyes the molecular structure of which is undisclosed. To obtain the popular gray and brown color tones in the coloration of photochromic eyeglass lenses, two or more dyes of differing absorbance wavelengths may be employed.

The total quantity of photochromic dye that is added is not specifically limited. In consideration of the high transmittance during color fading and suitable degree of light blocking during coloration that are required of eyeglass lenses, the quantity of dye added is preferably set within a range of from 0.001 to 1.0 weight part per 100 weight parts of monomer mixture.

Heat stabilizers, oxidation inhibitors, ultraviolet absorbents, mold separating agents, antistatic agents, dyes, and the like may also be added as needed to the lens substrate of the present invention.

The photochromic lens of the present invention is manufactured by mold casting polymerization of the monomer composition comprising the above-described photochromic dye, for example. Known methods of thermosetting polymerization and ultraviolet-curing polymerization may be employed in mold casting polymerization.

The thermosetting polymerization method will be given as an example below.

In this method, a suitable quantity of polymerization initiator is added to a monomer mixture in which a photochromic dye has been dissolved. The mixture is then poured into a mold and polymerized by heating. The polymerization initiator employed may be an azo initiator such as 2,2'-azobisisobutyronitrile or 2,2'-azobis(2,4-dimethylvaleronitrile), or a peroxide initiator such as benzoyl peroxide, lauroyl peroxide, or t-butylperoxy-2-ethyl hexanoate. (An ultraviolet initiator is employed in ultraviolet-setting polymerization methods.) However, the type of initiator and quantity added are suitably determined to obtain a good polymerization state in which the effect of the photochromic dye does not diminish or disappear. It is normally desirable to employ the initiator in a quantity falling within a range of from 0.001 to 5 weight percent of the total quantity of monomer mixture. The heating conditions for polymerization differ with the initiator employed; however, the heating temperature normally falls within a range of from 20 to 80° C. and the heating period within a range of from 6 to 48 hours.

Further, to increase the degree of polymerization of the lens, it is possible to gradually raise the reaction temperature to a range of 80° C. or above as the polymerization reaction progresses. The lens is released from the mold after completion of polymerization, and then may be subjected to reheating as necessary to correct for distortion of the surface produced during the polymerization step and mold release.

An organopolysiloxane hardening solution is coated on the lens obtained by mold casting polymerization and the solution is cured to impart a hard surface film. However, in the manufacturing method of the present invention, irradiation with ultraviolet radiation in the wavelength region of 300 nm and below is conducted prior to coating of the hardening solution to stabilize adhesion between the substrate resin lens and the hard surface film. The lower limit of the wavelength of the ultraviolet radiation is not restricted, but is generally about 150 nm with most light sources.

Low-pressure mercury lamps yielding both 185 nm and 254 nm ultraviolet radiation are suitably employed as sources of ultraviolet radiation, for example. They produce ozone and active oxygen molecules from oxygen in the atmosphere, activating the surface of the lens substrate, as well as breaking down macromolecular chains to activate the surface of the substrate. Since these wavelengths of ultraviolet radiation are absorbed by the atmosphere and ozone that is produced, the exposure distance of the lens to the lamp is preferably not greater than 20 cm, more preferably not greater than 10 cm. Although it depends on the output of low-pressure mercury lamps and the distance from the lamp to the lens, an improvement in adhesion is normally seen with an exposure of from 30 to 600 sec, for example.

An organic silicon compound (4) comprising alkoxy groups and epoxy groups within its molecular structure is employed as the coating composition serving as starting material for the hard film employed in the present invention.

Organic silicon compound (4) desirably comprises at least two alkoxy groups and at least one epoxy group within its molecular structure. A specific example is the trifunctional organic silicon compound denoted by general formula (I) below.

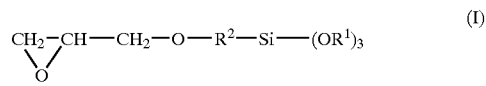

(I)

In the formula, $R^1$ denotes an alkyl group having from 1 to 4 carbon atoms and $R^2$ denotes an alkylene group having from 1 to 4 carbon atoms. In the formula, $R^1$ preferably denotes a methyl, ethyl, propyl, or butyl group, and $R^2$ a methylene, ethylene, propylene, or butylene group.

Further, colloidal metal oxide (5) is added to the organic silicon compound to improve surface hardness. Examples of colloidal metal oxides are the oxides of single members selected from the group consisting of Si, Al, Sn, Sb, Ta, Ce, La, Fe, Zn, W, Zr, In, and Ti; mixtures of two or more of the metal oxides; and complexes of two or more of the metal oxides.

The coating composition will be described below for the example of a metal oxide silica (colloidal silica). Highly concentrated water-dispersed colloidal silica (for example, having an $SiO_2$ solid component of 40 percent or more) is desirably employed as the colloidal silica so that no surplus water remains following hydrolysis of the organic silica compound. An average particle size of 5 to 100 micrometers is preferred, with 5 to 30 micrometers being more preferred. The use of an organopolysiloxane coating compound comprising a high concentration of colloidal silica permits the obtaining of a hard film with good scratch resistance.

Accordingly, the usefulness (scratch resistance) of the coating composition employed in the present invention is particularly good when a high concentration of colloidal silica is contained. Thus, the quantity of colloidal silica employed in the coating composition of the present invention, based on the total quantity of colloidal silica and organic silicon compound, is desirably set to 55 to 90 molar percent, and more preferably set to within a range of 75 to 90 molar percent (based on dry $SiO_2$ component). This remains essentially true even when the metal oxide is not silica (colloidal silica). Since the optimal dispersion medium, particle size, and metal oxide content are not uniform, it is preferred that the optimal values are suitably adjusted.

A hardening agent is normally added to the coating composition. Examples of hardening agents are imidazole derivatives and acetylacetone metal complexes, with acetylacetone aluminum complexes being particularly effective. A quantity adequate to harden the hydrolysis product of the colloidal silica and organic silicon compound is added. That is, a quantity falling within a range of from 1 to 10 g per mol of the total quantity of hydrolysis product of colloidal silica (based on $SiO_2$) and organic silicon compound is desirably added.

An organic acid is employed in the hydrolysis of the organic silica compound of formula (I). Examples are formic acid, acetic acid, and propionic acid. Acetic acid is desirably employed from the perspective of the stability of the coating composition. The quantity of organic acid added is desirably from 5 to 30 g per mol of the total quantity of colloidal silica and organic silicon compound. A lower quantity causes the coating composition to tend to gel and a higher quantity generates a powerful stench and is undesirable from an operational viewpoint.

A suitable solvent is desirably added to the coating composition to achieve uniform hydrolysis of the organic silicon compound and suitably adjust the degree thereof. Desirable examples of such solvents are cellosolves such as methyl cellosolve, ethyl cellosolve, and butyl cellosolve, which are preferably further combined with isopropyl alcohol, butanol, or the like. The ratio of cellosolve is desirably not less than 3 weight percent, preferably not less than 10 weight percent, of the total quantity of solvent. When the proportion of colloidal silica is high and the proportion of cellosolve in the solvent is less than 3 weight percent of the total quantity of solvent, gelling tends to occur during preparation of the coating composition.

A silicon surfactant can be added to the coating composition serving as starting material for the hard film employed in the present invention to improve the smoothness of the coating. It is further possible to add ultraviolet absorbents and oxidation inhibitors to improve light resistance and prevent coating deterioration.

The coating composition can be applied to the above-described UV-irradiated plastic substrate by dipping, spin coating, roll coating, spray coating, or the like. Once applied, the coating composition can be cured by heating. The heating temperature is preferably 40 to 150° C., more preferably 80 to 130° C. The heating time is desirably from 1 to 4 hours.

An antireflective film can be applied to the surface of the cured coating obtained as set forth above to improve the antireflective effect of the plastic lens. The antireflective film can be formed as a single layer or a lamination of multiple layers from dielectrics such as $SiO$, $SiO_2$, $Si_3N_4$, $TiO_2$, $ZrO_2$, $Al_2O_3$, and $MgF_2$ by vacuum vapor deposition, ion sputtering, ion plating, or the like. Reflection at the interface of the antireflective layer with the atmosphere can be inhibited. When the antireflective film is a single layer, the optical thickness of the film is desirably $\lambda 0/4 (\lambda 0 = 450$ to $650$ nm). Useful antireflective films also include multilayer antireflective films in the form of double-layer films with optical film thicknesses of from $\lambda 0/4 - \lambda 0/4$ of differing refractive indexes and triple-layer films with optical film thicknesses of $\lambda 0/4 - \lambda 0/2 - \lambda 0/4$ or $\lambda 0/4 - \lambda 0/4 - \lambda 0/4$, as well as multilayer coatings with alternating partially equivalent films.

The plastic photochromic lens obtained by the manufacturing method of the present invention comprises a methacrylic resin lens exhibiting rapid coloration and color fading reaction rates accompanying on it a hard surface film of good abrasion resistance and good adhesion. Accordingly, it is particularly useful in eyeglasses.

EXAMPLES

The present invention is described in greater detail below through examples. However, the present invention is not limited thereto. The physical property evaluation methods employed in the examples and comparative examples were as follows:

(a) Color Fading Reaction Rate:

A plano lens 2.0 mm in thickness was colored by exposure for 5 min at 20° C. using a xenon lamp (1.2 mW/cm$^2$·UV365), after which the time required for half of the absorbance intensity at 550 nm to fade during the color fading process in a dark location was measured as the half life period of fading of the lens. An instantaneous photometric System MCPD-3000 made by Ohtsuka Electronics (Ltd.) was employed for the measurement.

(b) Surface Hardness

The surface was rubbed 50 times (back and forth) with steel wool #0000 with a load of 1,000 g, after which the resistance to scratching was evaluated based on the following scale:

A: Almost no scratching
B: Slight scratching
C: Some scratching
D: Substantial scratching (c) Adhesion The hard film surface was cut into a checkerboard pattern (10×10 squares) at intervals of 1 mm, adhesive cellophane tape (No. 405, made by Nichiban (Ltd.)) was forcefully applied, the tape was abruptly removed at a 90 degree angle, and the number of remaining squares was checked.

(Preparation of Coating Composition (A))

A solution was prepared by adding 2.0 weight parts of 0.5N hydrochloric acid and 20 weight parts of acetic acid to 240 weight parts of colloidal silica (Snowtex-40, water-dispersed silica, average particle size of 10 to 20 micrometers, made by Nissan Chemicals (Ltd.)) with a 40 percent $SiO_2$ concentration. To this solution were added dropwise 95 weight parts of γ-glycidoxypropyltrimethoxysilane (a trifunctional organic silicon compound) with stirring at 35° C. The mixture was stirred for 8 hours at room temperature and then left standing for 16 hours. To 320 weight parts of this hydrolysis solution were added 80 weight parts of methyl cellosolve, 120 weight parts of isopropyl alcohol, 40 weight parts of butyl alcohol, 16 weight parts of aluminum acetyl acetone, 0.2 weight part of silicone surfactant, and 0.1 weight part of ultraviolet absorbant. The mixture was stirred for 8 hours and then aged for 24 hours at room temperature to obtain a coating composition. This was denoted as coating composition (A). The quantity of colloidal silica in the coating composition was 80 molar percent (based on $SiO_2$ solid component) of the total quantity of colloidal silica and γ-glycidoxypropyltrimethoxysilane.

(Preparation of Coating Composition (B))

Coating composition (B) was prepared in the same manner as coating composition (A), with the exception that the quantity of γ-glycidoxypropyltrimethoxysilane was changed to 253 weight parts.

(Preparation of Coating Composition (C))

Coating composition (C) was prepared in the same manner as coating composition (A), with the exception that 120 weight parts of ion-exchange water were employed in place of the colloidal silica.

Example 1

To a monomer composition comprising 50 weight parts of 2,2-bis[4-(methacryloxyethoxy)phenyl]propane, 15 weight parts of triethyleneglycol dimethacrylate, 15 weight parts of trimethylolpropane trimethacrylate, 10 weight parts of benzyl acrylate, and 10 weight parts of glycidyl methacrylate were admixed and dissolved a polymerization moderator in the form of 1 weight part of 2,4-diphenyl-4-methyl-1-pentene, a photochromic dye in the form of 0.05 weight part of CNN-3, made by Tokuyama (Ltd.), a radical polymerization initiator in the form of 0.50 weight part of t-butyl peroxyneodecanate, and a mold separating agent in the form of 0.0001 weight part of Shinetsu Silicone KF353A, made by Shinetsu Chemicals (Ltd.). The preparation was denoted as substrate composition (A). This was poured into a mold comprised of two glass molds and a plastic gasket. The mold was charged to a hot-air circulating heating furnace and heated for 12 hours at 40° C. The temperature was increased to 85° C. over 4 hours. The temperature was then maintained at 85° C. for 2 hours to conduct polymerization. The polymer obtained by separation from the mold was a highly transparent polymer composition in the form of a flat lens 75 mm in diameter, 2.0 mm thick, with a refractive power of 0.00 diopter. This lens was annealed by reheating to 120° C. for 2 hours.

Next, the lens was processed for 180 sec at an exposure distance of 30 mm with a low-pressure mercury radiation device in the form of a UV Modifier OC-2506 (wavelengths 185 nm and 245 nm) made by Eye-Graphics (Ltd.). The lens was then immersed for 360 sec in a 10 percent NaOH aqueous solution at 60° C., rinsed, and heat dried. Once the lens had cooled, coating composition (A) was applied by dipping (lifting rate of 20 cm/min) at 10° C., and the coating was cured by heating for 90 min at 120° C. The lens with hard surface film obtained in this manner had a surface hardness of A, a film adhesion of 100/100, and was suitable for use as an eyeglass lens.

This lens was colored by exposure to a xenon lamp (1.2 mW/cm$^2$·UV365) at 20° C. and then subjected to spectral measurement 5 min later. The lamp was then extinguished and the time required for the intensity of absorbance at the principal wavelength to diminish to half of the coloration level was measured; this was taken as the half value period denoting the color fading reaction rate. The half-value period was 95 sec.

Comparative Example 1

A highly transparent lens with a hard surface film in the form of a flat lens with a diameter of 75 mm, a thickness of 2.0 mm and a refractive power of 0.00 diopters was prepared in the same manner as Example 1, with the exception that the monomer composition was changed (substrate composition B) to 50 weight parts of 2,2-bis[4-(methacryloxyethoxy)phenyl]propane, 40 weight parts of triethyleneglycol dimethacrylate, and 10 weight parts of glycidyl methacrylate. This lens had a surface hardness of A, a film adhesion of 100/100, and was suitable for use as an eyeglass lens. However, when subjected to the same measurement as in Example 1, the half life period was 125 sec. Thus, the reaction rate was clearly slower than that of the lens of Example 1 due to the absence in the monomer composition of the trifunctional or greater methacrylic ester monomer that is an essential element of the present invention.

Examples 2 to 10

Highly transparent lenses with hard surface films in the form of flat lenses were obtained with a diameter of 75 mm, a thickness of 2.0 mm and a refractive power of 0.00 diopters in the same manner as Example 1, with the exception that the photochromic dye in the monomer composition was varied, as indicated in Table 1. All of the lenses obtained had a surface hardness of A, a film adhesion of 100/100, and were suitable for use as eyeglass lenses.

When the same measurement was conducted as in Example 1, the half life period of fading was as indicated in Table 1.

Comparative Examples 2 to 10

Highly transparent lenses with hard surface films in the form of flat lenses were obtained with a diameter of 75 mm, a thickness of 2.0 mm and a refractive power of 0.00 diopters in the same manner as Example 1, with the exception that the photochromic dye in the monomer composition was varied, as indicated in Table 1. All of the lenses obtained had a surface hardness of A, a film adhesion of 100/100, and were suitable for use as eyeglass lenses.

However, when the same measurement was conducted as in Example 1, the half life periods of fading were as indicated in Table 1. Thus, due to the absence in the monomer composition of the trifunctional or greater methacrylic ester monomer that is an essential element of the present invention, the reaction rates were clearly slower than those of lenses comprising the trifunctional or greater methacrylic ester monomer of Examples 2 to 10 employing the same photochromic dyes.

TABLE 1

| | Photochromic dye | Substrate composition | Pre-treatment | Half life period of fading | Film hardness | Adhesion |
|---|---|---|---|---|---|---|
| Example. 1 | CNN-3 | (A) | UV irradiation | 95 | A | 100/100 |
| Comp. Ex. 1 | | (B) | UV irradiation | 125 | A | 100/100 |
| Example. 2 | CNN-4 | (A) | UV irradiation | 225 | A | 100/100 |
| Comp. Ex. 2 | | (B) | UV irradiation | 300 | A | 100/100 |
| Example. 3 | CNN-7 | (A) | UV irradiation | 35 | A | 100/100 |
| Comp. Ex. 3 | | (B) | UV irradiation | 55 | A | 100/100 |
| Example. 4 | FG-3 | (A) | UV irradiation | 120 | A | 100/100 |
| Comp. Ex. 4 | | (B) | UV irradiation | 140 | A | 100/100 |
| Example. 5 | CY | (A) | UV irradiation | 145 | A | 100/100 |
| Comp. Ex. 5 | | (B) | UV irradiation | 180 | A | 100/100 |
| Example. 6 | FL | (A) | UV irradiation | 135 | A | 100/100 |
| Comp. Ex. 6 | | (B) | UV irradiation | 150 | A | 100/100 |
| Example. 7 | RU | (A) | UV irradiation | 145 | A | 100/100 |
| Comp. Ex. 7 | | (B) | UV irradiation | 160 | A | 100/100 |
| Example. 8 | BR | (A) | UV irradiation | 220 | A | 100/100 |
| Comp. Ex. 8 | | (B) | UV irradiation | 295 | A | 100/100 |

TABLE 1-continued

| | Photo-chromic dye | Substrate composition | Pre-treatment | Half life period of fading | Film hardness | Adhesion |
|---|---|---|---|---|---|---|
| Example. 9 | OB | (A) | UV irradiation | 90 | A | 100/100 |
| Comp. Ex. 9 | | (B) | UV irradiation | 115 | A | 100/100 |
| Example. 10 | Blue A | (A) | UV irradiation | 90 | A | 100/100 |
| Comp. Ex. 10 | | (B) | UV irradiation | 115 | A | 100/100 |

Comparative Examples 11 to 20

Highly transparent lenses with hard surface films in the form of flat lenses were obtained with a diameter of 75 mm, a thickness of 2.0 mm and a refractive power of 0.00 diopters in the same manner as in Examples 1–10, with the exception that the treatment with the UV modifier was omitted. All of the lenses obtained had a surface hardness of A. However, since trifunctional or greater methacrylic ester monomers tending to decrease adhesion of the film were incorporated to increase the reaction rate and since the UV irradiation treatment of 300 nm or less that is an essential element of the present invention was not conducted, the adhesion of the film was 0/100 and the lenses were not suitable for use in eyeglasses.

Comparative Examples 21 to 30

Highly transparent lenses with hard surface films in the form of flat lenses were obtained with a diameter of 75 mm, a thickness of 2.0 mm and a refractive power of 0.00 diopters in the same manner as in Examples 1 to 10, with the exception that treatment with the UV modifier was not conducted, and plasma treatment was conducted by the usual film adhesion enhancing method. The plasma treatment was conducted with a PR-501A made by Yamato Kagaku (Ltd.) for 300 sec in a 0.6 Torr oxygen atmosphere. All of the lenses obtained had a surface hardness of A. However, since trifunctional or greater methacrylic ester monomers tending to decrease adhesion of the film were incorporated to increase the reaction rate, and since the UV irradiation treatment of 300 nm or less that is an essential element of the present invention was not conducted, the adhesion of the film was 0/100 and the lenses were not suitable for use in eyeglasses.

TABLE 2

| | Photochromic dye | Substrate composition | Pretreatment | Half life period of fading | Film hardness | Adhesion |
|---|---|---|---|---|---|---|
| Example. 1 | CNN-3 | (A) | UV irradiation | 95 | A | 100/100 |
| Comp. Ex. 11 | | | No UV irradiation | | A | 0/100 |
| Comp. Ex. 21 | | | Plasma treatment | | A | 0/100 |
| Example. 2 | CNN-4 | (A) | UV irradiation | 225 | A | 100/100 |
| Comp. Ex. 12 | | | No UV irradiation | | A | 0/100 |
| Comp. Ex. 22 | | | Plasma treatment | | A | 0/100 |
| Example. 3 | CNN-7 | (A) | UV irradiation | 35 | A | 100/100 |
| Comp. Ex. 13 | | | No UV irradiation | | A | 0/100 |
| Comp. Ex. 23 | | | Plasma treatment | | A | 0/100 |
| Example. 4 | FG-3 | (A) | UV irradiation | 120 | A | 100/100 |
| Comp. Ex. 14 | | | No UV irradiation | | A | 0/100 |
| Comp. Ex. 24 | | | Plasma treatment | | A | 0/100 |
| Example. 5 | CY | (A) | UV irradiation | 145 | A | 100/100 |
| Comp. Ex. 15 | | | No UV irradiation | | A | 0/100 |
| Comp. Ex. 25 | | | Plasma treatment | | A | 0/100 |
| Example. 6 | FL | (A) | UV irradiation | 135 | A | 100/100 |
| Comp. Ex. 16 | | | No UV irradiation | | A | 0/100 |
| Comp. Ex. 26 | | | Plasma treatment | | A | 0/100 |
| Example. 7 | RU | (A) | UV irradiation | 145 | A | 100/100 |
| Comp. Ex. 17 | | | No UV irradiation | | A | 0/100 |

TABLE 2-continued

|  | Photochromic dye | Substrate composition | Pretreatment | Half life period of fading | Film hardness | Adhesion |
|---|---|---|---|---|---|---|
| Comp. Ex. 27 |  |  | Plasma treatment |  | A | 0/100 |
| Example. 8 | BR | (A) | UV irradiation | 220 | A | 100/100 |
| Comp. Ex. 18 |  |  | No UV irradiation |  | A | 0/100 |
| Comp. Ex. 28 |  |  | Plasma treatment |  | A | 0/100 |
| Example. 9 | OB | (A) | UV irradiation | 90 | A | 100/100 |
| Comp. Ex. 19 |  |  | No UV irradiation |  | A | 0/100 |
| Comp. Ex. 29 |  |  | Plasma treatment |  | A | 0/100 |
| Example. 10 | Blue-A | (A) | UV irradiation | 90 | A | 100/100 |
| Comp. Ex. 20 |  |  | No UV irradiation |  | A | 0/100 |
| Comp. Ex. 30 |  |  | Plasma treatment |  | A | 0/100 |

CNN-3, CNN-4, CNN-7, FG-3: Made by Tokuyama (Ltd.)
CY (Corn Yellow), FL (Flame), RU (Ruby), BR (Berry Red), OB (Oxford Blue): Made by James Robinson Co.
Blue A: Made by Great Lakes Co.

Example 11

A lens was obtained and measurements were conducted in the same manner as in Example 1, with the exception that the coating composition was changed to (B). Since coating composition (B) contained less colloidal metal oxide than coating composition (A), the surface hardness was lower than that of Example 1, but film adhesion was 100/100 and the half life period of fading was equivalent to that of Example 1. Thus, the lens was suited to use in eyeglasses.

Comparative Examples 31 and 32

Lenses were prepared and measurements were conducted in the same manner as in Example 1, with the exception that the coating composition and pretreatment conditions were changed, as indicated in Table 3. Although coating composition (B) was employed, since trifunctional or greater methacrylic ester monomers tending to decrease adhesion of the film were incorporated to increase the reaction rate, and since the UV irradiation treatment of 300 nm or less that is an essential element of the present invention was not conducted, the adhesion of the film was 0/100 and the lenses were not suitable for use in eyeglasses.

Comparative Examples 33 to 35

Lenses were prepared and measurements were conducted in the same manner as in Example 1, with the exceptions that the coating composition and the pretreatment conditions were changed, as indicated in Table 3. When coating composition (C) was employed and trifunctional or greater methacrylic ester monomers tending to decrease adhesion of the film were incorporated, adhesion was achieved in lenses in which UV irradiation and plasma treatment were conducted. However, since the colloidal metal oxides that are an essential element of the present invention were not incorporated into the coating composition, the surface hardness was C, and the lenses were not suited to use in eyeglasses.

TABLE 3

|  | Substrate composition | Hard film | Pretreatment | Half life period of fading | Film hardness | Adhesion |
|---|---|---|---|---|---|---|
| Example. 1 | (A) | (A) | UV irradiation | 95 | A | 100/100 |
| Comp. Ex. 11 |  |  | No UV irradiation |  | A | 0/100 |
| Comp. Ex. 21 |  |  | Plasma treatment |  | A | 0/100 |
| Example. 11 | (A) | (B) | UV irradiation | 95 | B | 100/100 |
| Comp. Ex. 31 |  |  | No UV irradiation |  | B | 0/100 |
| Comp. Ex. 32 |  |  | Plasma treatment |  | B | 0/100 |
| Comp. Ex. 33 | (A) | (C) | UV irradiation | 95 | C | 100/100 |
| Comp. Ex. 34 |  |  | No UV irradiation |  | C | 0/100 |
| Comp. Ex. 35 |  |  | Plasma treatment |  | C | 100/100 |

Example 12

A lens was obtained and evaluation conducted in the same manner as in Example 1 with the exceptions that the photochromic dye composition was changed to 0.040 weight part of CNN-7 and 0.020 weight part of CNN-4, made by Tokuyama (Ltd.); 0.020 weight part of Berry Red, made by James Robinson Co.; 0.005 weight part of CNN-3, made by Tokuyama (Ltd.). The lens was a flat lens with a diameter of 75 mm, a thickness of 2.0 mm, and a refractive power of 0.00 diopters that immediately assumed a dark gray coloration upon exposure to sunlight. The same measurements as in Example 1 were conducted, revealing a surface hardness of A and film adhesion of 100/100 and indicating that the lens was suitable for use in eyeglasses. With a half life period of fading of 95 sec, the transition from a colored state to an uncolored state was rapid, affording good performance as a photochromic lens.

Industrial Applicability

The present invention permits the strong adhesion of a hard film comprising a high concentration of colloidal metal oxide to a substrate lens comprising monomers in the form of trifunctional and greater methacrylic esters. As a result, the coloration reaction rate is rapid and surface hardness is quite high, making it possible to provide a plastic photochromic lens for use in eyeglasses affording good adhesion and having a hard surface film.

What is claimed is:

1. A method of manufacturing plastic photochromic lenses comprising:
    obtaining a lens by polymerizing and curing a monomer mixture comprising at least:
        one of a monofunctional and bifunctional methacrylic ester monomers in an amount of at least 50 weight percent of the monomer mixture:
        a trifunctional or greater methacrylic ester monomer in an amount of 1 to 30 weight percent of the monomer mixture; and
        at least one photochromic dye;
    directing radiation comprising ultraviolet radiation of a wavelength of less than or equal to 300 nm onto at least a portion of a surface of the lens obtained so that the radiation activates the surface of the lens to break down macromolecular chains of the surface of the lens;
    coating a composition onto the at least a portion of the surface of the lens that has been exposed to said radiation, the composition comprising:
        an organic silicon compound comprising at least one alkoxy group and at least one epoxy group; and
        a colloidal metal oxide; and
    curing said coating to obtain a hard surface film.

2. The method of manufacturing of claim 1, wherein said monofunctional methacrylic ester monomer is at least one monomer selected from the group consisting of methyl methacrylate, ethyl methacrylate, n-butyl methacrylate, ethylhexyl methacrylate, glycidyl methacrylate, benzyl methacrylate, phenyl methacrylate, cyclohexyl methacrylate, isobornyl methacrylate, and adamantyl methacrylate.

3. The method of manufacturing of claim 1, wherein said bifunctional methacrylic ester monomer is at least one monomer selected from the group consisting of ethylene glycol dimethacrylate, diethylene glycol dimethacrylate, triethylene glycol dimethacrylate, tetraethylene glycol dimethacrylate, tripropylene glycol dimethacrylate, 1,4-butanediol dimethacrylate, 1,6-hexanediol dimethacrylate, glycerin dimethacrylate, 2,2-bis[4-(methacryloxy)phenyl] propane, and 2,2-bis[4-(methacryloxyethoxy)phenyl] propane.

4. The method of manufacturing of claim 1, wherein said trifunctional or greater methacrylic ester monomer is at least one monomer selected from the group consisting of trimethylolpropane trimethacrylate, trimethylolethane trimethacrylate, and pentaerythritol trimethacrylate.

5. The method of manufacturing of claim 1, wherein the at least one photochromic dye is present in a range of from 0.001 to 1.0 weight part per 100 weight parts of the monomer mixture.

6. The method of manufacturing of claim 1, wherein the ultraviolet radiation of a wavelength of less than or equal to 300 nm is provided by a low-pressure mercury lamp.

7. The method of manufacturing of claim 1, wherein said organic silicon compound comprising at least two alkoxy groups.

8. The method of manufacturing of claim 1, wherein said organic silicon compound comprising an alkoxy group and an epoxy group is a trifunctional organic silicon compound denoted by general formula (I) below:

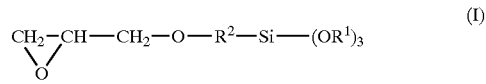

(I)

wherein $R^1$ denotes an alkyl group having from 1 to 4 carbon atoms and $R^2$ denotes an alkylene group having from 1 to 4 carbon atoms.

9. A plastic photochromic lens obtained by the manufacturing method of claim 1.

10. Eyeglasses comprising the plastic photochromic lens of claim 9.

* * * * *